United States Patent [19]
Fee

[11] Patent Number: 5,009,380
[45] Date of Patent: Apr. 23, 1991

[54] RAIL MOUNTED RACK FOR BOWL-SHAPED OR KETTLE-SHAPED CONTAINERS SUCH AS OUTDOOR GRILLS AND THE LIKE

[76] Inventor: Thomas G. Fee, 984 Stratford Rd., Mendota Heights, Minn. 55118

[21] Appl. No.: 534,298

[22] Filed: Jun. 5, 1990

Related U.S. Application Data

[63] Continuation of Ser. No. 305,108, Feb. 2, 1989, abandoned.

[51] Int. Cl.$^5$ .............................................. A47B 96/00
[52] U.S. Cl. .................................... 248/214; 248/315; 248/228; 248/302; 248/312.1
[58] Field of Search ............ 248/214, 318, 340, 311.2, 248/302, 231.5, 231.1, 228, 225.31, 231.6, 315, 210, 208, 99, 211, 215, 312.1; 220/401, 404; 126/25 R

[56] References Cited

U.S. PATENT DOCUMENTS

| | | | |
|---|---|---|---|
| 1,518,099 | 12/1924 | Neiswender | 248/214 |
| 2,596,543 | 5/1952 | Fox | 248/315 X |
| 3,433,443 | 3/1969 | Mangan et al. | 248/214 |
| 3,603,588 | 9/1971 | Ebstein | 248/315 X |
| 3,780,971 | 12/1973 | De Filipps | 248/214 X |
| 4,033,538 | 7/1977 | Levy | 248/214 |
| 4,573,654 | 3/1986 | Nottingham | 248/231.1 |
| 4,729,535 | 3/1988 | Frazier et al. | 248/231.5 X |
| 4,773,348 | 9/1988 | Rowley | 248/311.2 X |

FOREIGN PATENT DOCUMENTS

| | | | |
|---|---|---|---|
| 231912 | 3/1911 | Fed. Rep. of Germany | 248/231.5 |
| 855061 | 11/1960 | United Kingdom | 248/302 |

*Primary Examiner*—Karen J. Chotkowski
*Attorney, Agent, or Firm*—Merchant, Gould, Smith, Edell, Welter & Schmidt

[57] ABSTRACT

A horizontally disposed generally planar frame has an opening for removably holding a kettle or bowl-like container such as an outdoor grill nested in the opening with the frame extending over a railing along an edge of a deck. A bracing member is attached to the end of the frame at the railing and extends downward well below the railing and a pair of leg members extend downward from opposite sides of the frame opening and are angled toward the bracing member with means for removably securing the lower ends of the legs to the bracing member. The legs and the bracing member may be pivotably attached to the frame so when not in use they can be folded up for convenient storage. Alternatively, for smaller, relatively lightweight bowl-shaped grills the support legs can be eliminated.

20 Claims, 4 Drawing Sheets

FIG. 2
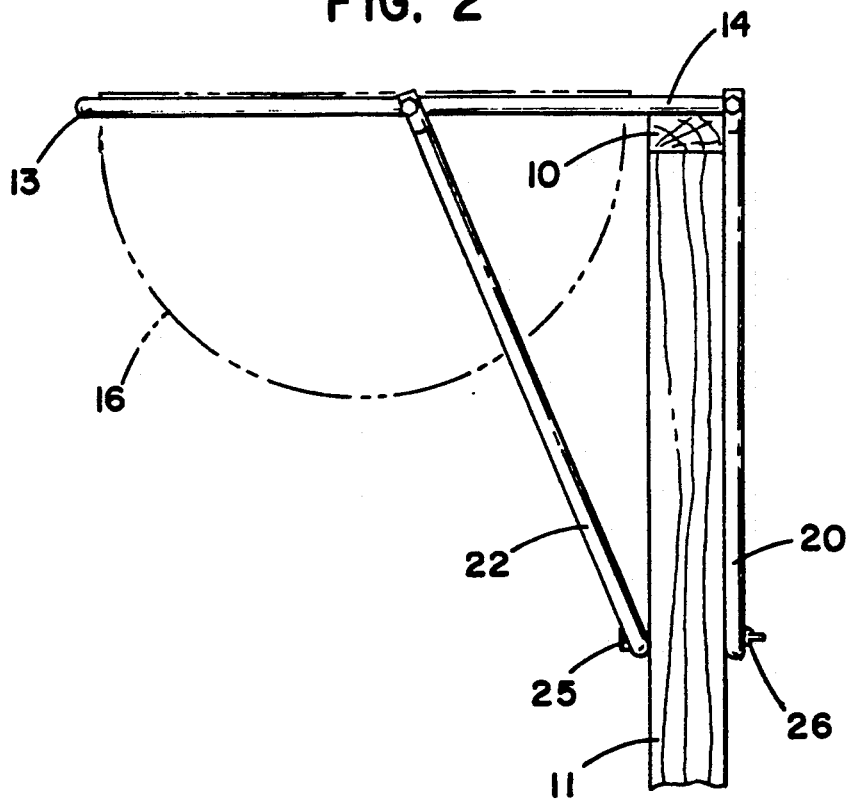
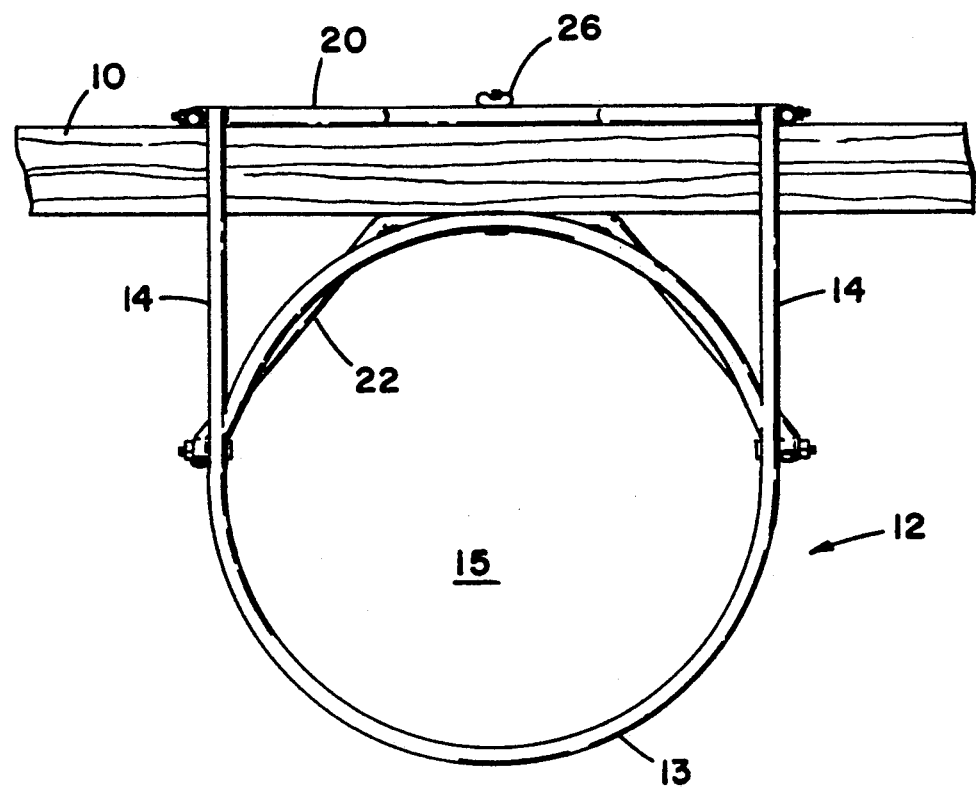
FIG. 3

RAIL MOUNTED RACK FOR BOWL-SHAPED OR KETTLE-SHAPED CONTAINERS SUCH AS OUTDOOR GRILLS AND THE LIKE

The present application is a continuation of U.S. Ser. No. 07/305,108, filed Feb. 2, 1989, and now abandoned.

FIELD OF THE INVENTION

This invention is directed toward providing a rack for holding bowl-shaped containers such as kettle-shaped outdoor grills nested in the rack with the rack supported by a railing running along an edge of a deck.

DESCRIPTION OF THE PRIOR ART

A number of devices have been marketed or patented for attaching a rack or shelf to a railing surrounding the deck of a boat or the patio or deck of a house. In general, these devices are attached to extend outward from the railing so they don't take up space on or over the deck. Also, they are then less of a fire hazard and less dangerous to children. An example is a collapsible shelf for use with a railing or the like in U.S. Pat. No. 3,433,443 by Mangan, et al. The Mangan device is a flat shelf with one end hooked onto the railing and extending out from the railing. It has two outer and one middle leg support members which extend down from the shelf and angle toward the railing posts. A cross member attached to the ends of the legs rests against the fence or railing posts to support the shelf. One of the drawbacks of the Mangan device is that it will only accommodate flat-bottomed containers. Round-bottomed containers, such as kettle-shaped or bowl-shaped grills or the like, would likely tip or rest insecurely on the Mangan shelf. Another drawback of the Mangan device is that because it is hooked onto the railing, it may require different lengths, forms or shapes for the hooking members to adapt or conform to different styles, shapes and sizes of railings so that the hooking means would have to be custom made or made adjustable for each type of railing. For example, a large-size cylindrical railing would likely need a different type of hooking arrangement than a small, rectangular, bar-like railing.

SUMMARY OF THE INVENTION

A generally planar, rigid horizontal frame defines an opening in which a round bottomed container, such as a kettle or bowl type outdoor grill, can be securely nested yet easily removed. One end of the frame extends over and rests on the top of a post-supported railing, such as generally found running along the edge of a deck of a boat or house, and the frame extends out from the railing. A rigid bracing member is attached to the end of the frame at the inside of the rail and extends downward along the inside of the post supports. In one embodiment, a single pair of support legs, each attached at one end to the frame at opposite sides of the opening, are angled downward from the frame and toward the bracing member and are attached at their other ends to a cross-member. Means are provided for releasably attaching the support legs cross-member between the support posts to the bracing member well below the rail to support the weight of the frame and the container. In this fashion the area directly underneath the frame opening is void of any obstruction so that a container such as a kettle-type outdoor grill or the like can rest securely nested in the frame opening. The rack and the grill that it holds can be supported on or by virtually any size, shape or form of railing without requiring any special adjustment so it has wide if not universal application. As a further feature, the bracing member and the support legs may be pivotally attached to the frame so when the rack is not being used, it can be detached from the rail and the bracing member and the support legs can be folded up for storage. The frame opening for holding the container can be made of different sizes or be made adjustable to accommodate different sized and shaped grills. The frame may also be made with a number of other openings for holding a number of other bowl-shaped containers. For example, if the frame is being used to hold an outdoor grill, other openings can be provided for holding bowl-like containers for condiments or utensils or the like in a nesting arrangement. As another feature, the support legs can be angled inward toward one another somewhat below the frame opening so that a receptacle for trash or ashes can be conveniently removably mounted between the support legs below the nested container.

In an alternate embodiment, for holding small, relatively lightweight bowl-shaped grills or the like, the support legs can be eliminated. The cross-member, which would then not be attached to any support legs, would still be located on one side of the rail support posts and is removably attached to the bracing member on the other side of the rail support posts well below the ralling to hold the rack in place.

BRIEF DESCRIPTION OF THE DRAWINGS

FIG. 2 is a side elevational view of the embodiment of FIG. 1;

FIG. 3 is a top plan view of the embodiment shown in FIG. 2;

DESCRIPTION OF THE PREFERRED EMBODIMENTS

Figure 1:
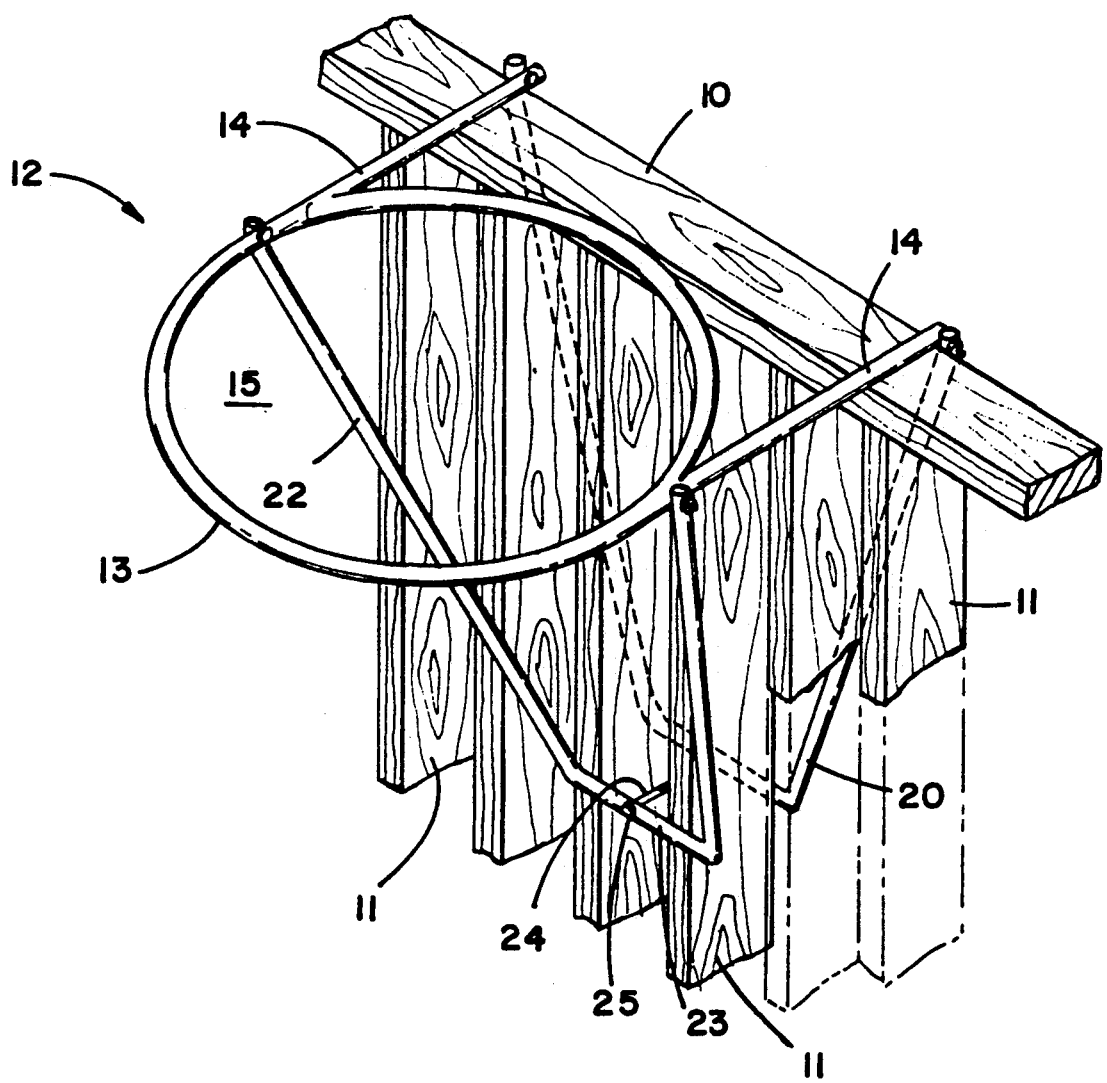
FIG. 1 is a perspective view of the preferred embodiment of the invention mounted in supporting fashion on a railing for holding a kettle-type outdoor grill.
Figure 4:
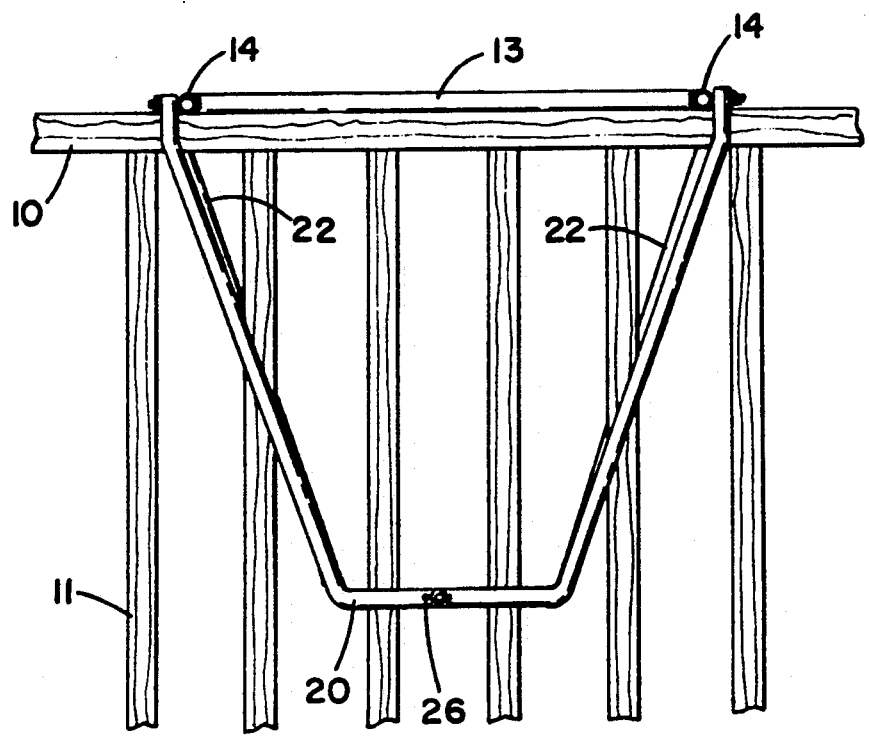
FIG. 4 is an elevational view as seen from inside the deck railing.
Figure 5:
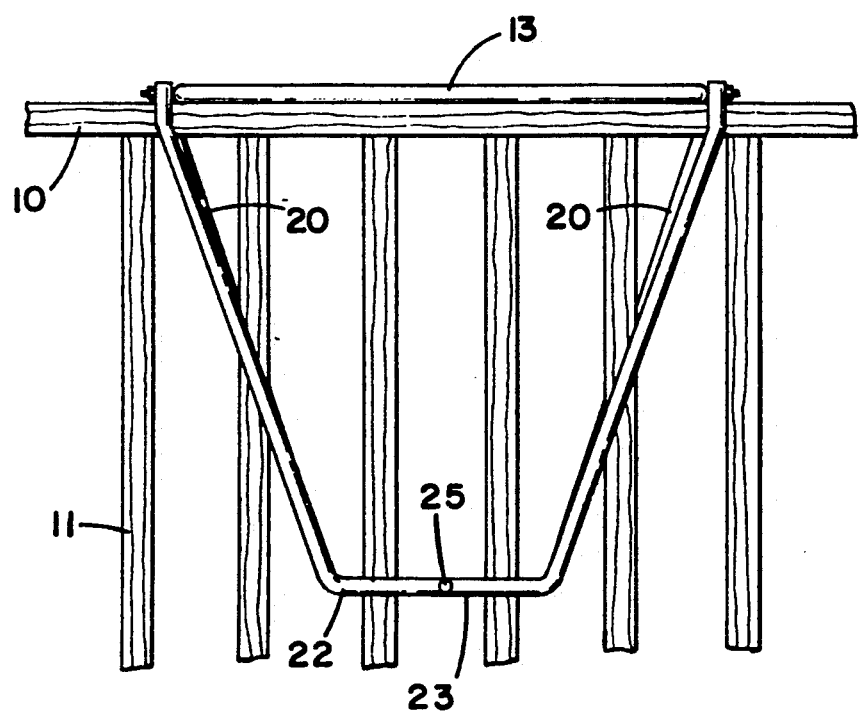
FIG. 5 is an elevational view from outside the deck railing.

A commonplace and conventional railing 10 rests on a series of spaced-apart vertical support posts 11 which are anchored in some fashion, not shown, along the edge of a boat or porch deck or patio or the like, not shown. A planar frame 12 has a curved or arcuate section 13 and oppositely disposed generally parallel arms 14 extending horizontally from arcuate section 13 so that the ends of arms 14 extend over and rest on the top of ralling 10. Curved or arcuate section 13 defines an opening 15 for receiving and holding a bowl-shaped container, such as a kettle-shaped outdoor grill 16 shown in dashed lines, nested in opening 15 with the rim of the grill 16 resting on frame 12 so it can be conveniently and easily lifted out if desired. Preferably, arcuate section 13 is in the form of a closed circle or ring to insure that the grill is stable when nested in opening 15. Arcuate section 13 can be made from a single bar or rod of metal which is bent into a suitable shape and arms 14 are each tangentially fastened at one end to arcuate section 13 on opposite sides of opening 15 by welding or in some other conventional fashion. Attached to the distal ends of arms 14 and extending vertically downward therefrom along the inside of railing 10 alongside railing posts 11 is a rigid generally planar bracing member 20. Bracing member 20 can be made in a variety of forms or shapes. For example, it can be a single metal bar or rod bent into a U-shape with a partially flat bottom and open at the top with the top ends attached to the ends of arms 14, or into a V-shape or into a rectangular shape or a number of variations or combinations thereof. Bracing member 20 (as well as the support legs which will be described later) may be made out of the same rod or bar material as frame 12 for manufacturing cost efficiency. In any event, bracing member 20 extends a significant or substantial distance below railing 10 along the inside of the support posts 11. Preferably bracing member 20 is pivotably attached to the ends of arms 14 so that when the rack is not in use and is removed from the railing the bracing member can be swung or folded for convenient storage.

A single pair of support legs 22 are each attached at one end to frame 12 at opposite sides of opening 15 and are angled downward therefrom and toward posts 11. The other ends of support legs 22 are connected to a rigid cross-member 23. Support legs 22 and cross-member 23 may also be made out of the same bar or rod material as frame 12 and can be made separately and joined together by welding or the like or can be one continuous piece of bar or rod stock bent or formed to the desired shape. Cross-member 23 located at the outer side of rail support posts 11 is removably secured to the lower end of bracing member 20 located on the inner side of posts 11 in some fashion such as by a threaded bolt 24 with bolt head 25 at one end and the shank passing between the support posts and through suitable openings drilled or otherwise formed in the lower end of bracing member 20 and in cross-member 23 and a wing nut 26 threaded on at the other end. Other means, such as a quick disconnect clamp, can also be utilized to releasably secure cross-member 23 to bracing member 20 with the cross-member 23 resting against at least one of the posts 11. Preferably, support legs 22 are pivotably attached to frame 12 so when the rack is not in use and is removed from the railing, legs 22 with cross-member 23 can be swung or folded so that the rack can be conveniently stored.

Figure 6:
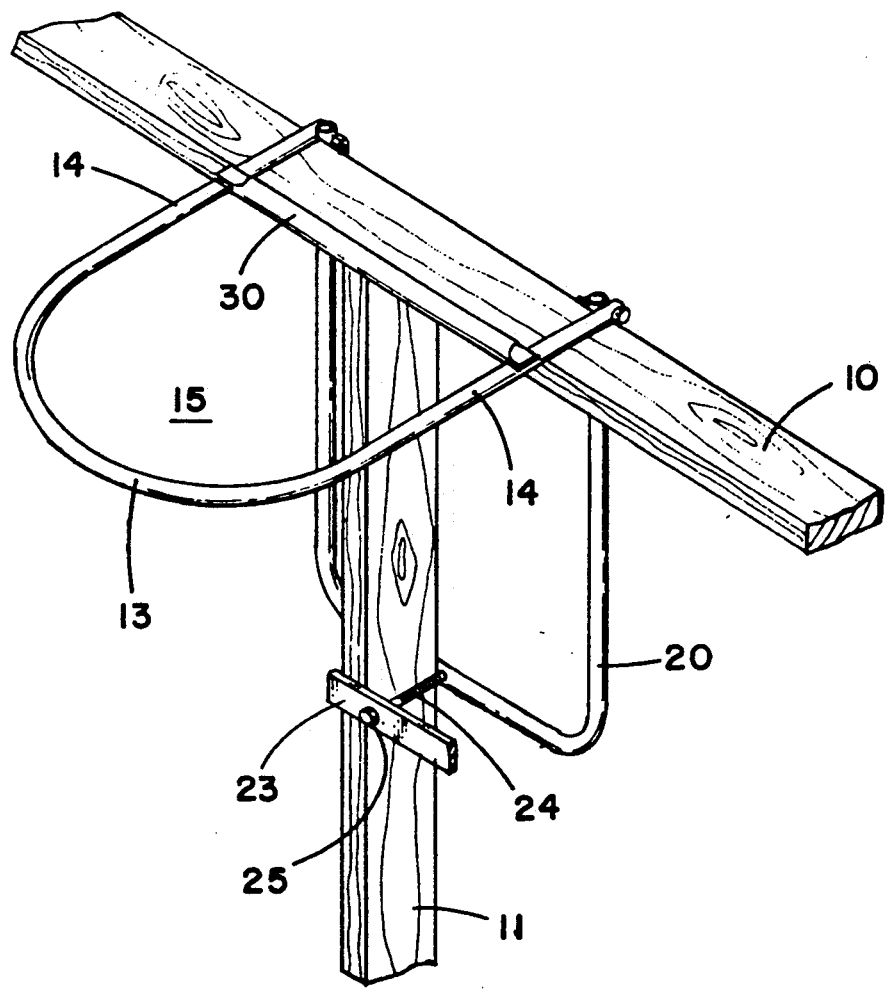
FIG. 6 is a perspective view of an alternate embodiment of the invention for holding small lightweight kettle-shaped grills.

FIG. 6 illustrates an embodiment for accommodating smaller, relatively lightweight bowl-shaped or kettle-shaped grills without support legs 22. Like parts are identified with the same reference numerals as in the FIGS. 1–5 embodiment. The arcuate section 13 of frame 12 is U-shaped and a bar 30 is welded or otherwise attached at each end to arms 14 at the open end of the U. Cross-member 23, on the outer side of rail support posts 11 is removably attached to the lower end of bracing member 20, located along the inner side of posts 11 to hold the rack in place, similar to the earlier described embodiment. Alternatively, bar 30 may be eliminated and the arms 14 angled slightly toward one another to ensure that the nested grill is stable. For clarity, only one of the support posts 11 for railing 10 is shown.

I claim:

1. A combination comprising:
   (a) a railing arrangement having an upper surface and first and second opposite sides; and, said railing arrangement including a horizontal railing supported by a plurality of spaced support members having first and second, opposite, sides corresponding to said first and second sides of sail railing arrangement; and,
   (b) a rack for a bowl-shaped grill; said rack being mounted on said railing arrangement; said rack including: a generally planar frame portion; a depending bracing member; and, means for securing said bracing member to said support members of said railing arrangement;
      (i) said planar frame portion including a support arm arrangement extending across said upper surface of said railing arrangement and between said first and second sides of said railing arrangement; said support arm arrangement including a pair of substantially horizontal arm members;
      (ii) said planar frame portion including an arcuate frame member constructed and arranged for supportive receipt therein of a circular bowl-shaped grill; said arcuate frame member being supported by said support arm arrangement in extension outwardly from said first side of said railing arrangement;
      (iii) said depending bracing member comprising a substantially U-shaped member depending downwardly from said pair of substantially horizontal arm members along said second side of said railing arrangement;
      (iv) said means for securing said bracing member to said railing arrangement including: a cross-brace member and an anchoring extension; said cross-brace member being positioned on said first side of said railing arrangement; and, said anchoring extension extending between at least two of said support members, of said railing arrangement, and in securing relation between said cross-brace member and a portion of said depending bracing member; at least one of said support members of said railing arrangement being securely clamped between said depending bracing member and said cross-brace member.

2. A combination according to claim 1 wherein said anchoring extension is selectively disengageable from at least one of said cross-brace member and depending bracing member, to facilitate dismounting of said rack from said railing arrangement.

3. A combination according to claim 1 wherein said depending bracing member is pivotally mounted on said pair of substantially horizontal arm members, to facilitate collapse of said rack when selectively removed from said railing arrangement.

4. A combination according to claim 1 including:
   (a) a pair of support legs extending between said cross-brace member and said planar frame portion of said rack, said pair of support legs being on a side of said railing arrangement opposite from said depending bracing member.

5. A combination according to claim 4 wherein said pair of support legs and said cross-brace member collectively define a U-shaped frame member.

6. A combination according to claim 5 wherein said U-shaped frame member is pivotally mounted on said rack planar frame portion, for selective collapse when said rack is dismounted from said railing arrangement.

7. A combination according to claim 1 wherein said anchoring extension comprises a threaded bolt.

8. A combination comprising:
   (a) a railing arrangement having a railing supported by a plurality of spaced support members; said spaced support members having first and second, opposite, sides;

(b) a rack for a bowl-shaped grill; said rack including: a frame portion; a depending bracing member; and, means for securing said bracing member to said support members;
   (i) said frame portion including a support arm arrangement extending over said railing arrangement and between said first and second sides of said support members;
   (ii) said planar frame portion including means for support of a bowl-shaped grill in extension outwardly from said first side of said support members;
   (iii) said depending bracing member comprising a substantially U-shaped member depending downwardly from said frame portion along said second side of said support members; and,
   (iv) said means for securing said bracing member to said railing arrangement including a cross-brace member and an anchoring extension; said cross-brace member being positioned on said first side of said support members; and, said anchoring extension extending between at least two of said support members and in securing relation between said cross-brace member and a portion of said depending bracing member.

9. A combination according to claim 8 wherein said anchoring extension is selectively disengagable from at least one of said cross-brace member and depending member, to facilitate dismounting of said rack from said railing arrangement.

10. A combination according to claim 8 wherein said depending bracing member is pivotally mounted on said frame portion, to facilitate collapse of said rack, when said rack is selectively removed from said railing arrangement.

11. A combination according to claim 8 including a pair of support legs extending between said cross-brace member and said frame portion of said rack, said pair of support legs being on a side of said support members opposite from said depending bracing member.

12. A combination according to claim 11 wherein said pair of support legs and said cross-brace member collectively define a U-shaped frame member.

13. A combination according to claim 12 wherein said U-shaped frame member is pivotally mounted on said frame portion, for selective collapse when said rack is dismounted from said railing arrangement.

14. A rack arrangement for mounting a bowl-shaped grill on a railing arrangement, the railing arrangement having a plurality of spaced support members with first and second, opposite, sides; said rack arrangement including:

(a) a rack including a frame portion, a depending bracing member and means for securing said depending bracing member to the support members of the railing arrangement;
(b) said frame portion being constructed and arranged to operably extend over the railing arrangement between the first and second sides of the spaced support members;
(c) said frame portion including an arcuate frame member constructed and arranged for supportive receipt therein of a bowl-shaped grill; said arcuate frame member being oriented for operative support of the grill, in said frame portion in extension outwardly from the first side of the spaced support members, when said rack arrangement is operatively positioned on the railing arrangement;
(d) said depending bracing member comprising a substantially U-shaped member constructed and arranged to depend downwardly from said frame portion along the second side of the support members, when said rack arrangement is operatively positioned on the railing arrangement; and,
(e) said means for securing said bracing member to said railing arrangement including a cross-brace member and means for operatively clamping at least one of the support members between said cross-brace member and said depending bracing member.

15. An arrangement according to claim 14 wherein said depending bracing member is pivotally mounted on said frame portion, to facilitate collapse of said rack, when said rack is selectively removed from the railing arrangement.

16. An arrangement according to claim 14 including a pair of support legs operatively extending between said cross-brace member and said frame portion of said rack, said pair of support legs being constructed and arranged to be oriented adjacent a side of the support members of the railing arrangement opposite from said depending bracing member, when said rack arrangement is operatively positioned on the railing arrangement.

17. A combination comprising:
(a) a railing arrangement including a railing supported by a plurality of spaced support members;
   (i) said railing having upper and lower surfaces;
   (ii) said railing arrangement having first and second, opposite, sides; and,
   (iii) said plurality of spaced support members having first and second sides corresponding to said first and second sides of said railing arrangement;
(b) a rack mounted on said railing arrangement; said rack including: a frame portion; a depending bracing member; and, means for securing said bracing member to said support members of said railing arrangement without engaging said railing lower surface;
   (i) said frame portion including a support arrangement extending across said upper surface of said railing arrangement and between said first and second sides of said railing arrangement;
   (ii) said frame portion including a frame member constructed and arranged for supportive receipt therein of a bowl-shaped grill; said frame member being supported by said support arrangement in extension outwardly from said first side of said railing arrangement; said depending bracing member extending downwardly to a point substantially lower than said lower surface of said railing;
   (iv) said means for securing said bracing member to said railing arrangement including a cross-brace member and an anchoring extension; said cross-brace member being positioned on said first side of said railing arrangement; and, said anchoring extension extending between at least two of said support members, without engaging said railing, and in securing relation between said cross-brace member and a portion of said depending bracing member; at least one of said support members of said railing arrangement being securely clamped between said depending bracing member and said cross-brace member.

18. A combination according to claim 17 wherein:
(a) said depending bracing member comprises a substantially U-shaped member.

19. A combination according to claim 18 wherein:
(a) said support arrangement includes a pair of arm members; and,
(b) said depending bracing member is pivotally mounted on said pair of arm members, to facilitate collapse of said rack when selectively removed from said railing arrangement.

20. A combination according to claim 17 including a pair of support legs extending between said cross-brace member and said frame portion of said rack; said pair of support legs being oriented on a side of said railing arrangement opposite from said depending bracing member.

* * * * *